Figure 1:
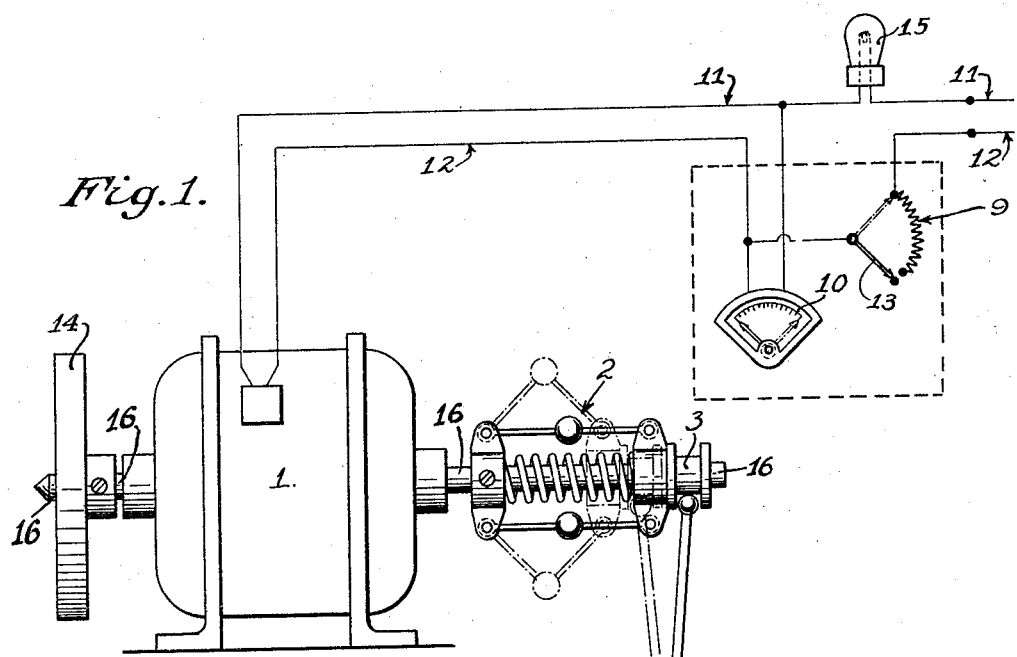

May 16, 1933.　　　LE ROY S. HUBBELL　　　1,909,538
RADIO TUNING DEVICE
Filed March 30, 1931

INVENTOR,
LeRoy S. Hubbell

Patented May 16, 1933

1,909,538

UNITED STATES PATENT OFFICE

LE ROY S. HUBBELL, OF SAN FRANCISCO, CALIFORNIA

RADIO TUNING DEVICE

Application filed March 30, 1931. Serial No. 526,309.

This invention relates to an electrically controlled device for tuning a radio receiver or other apparatus which is tuned to operate on different frequencies.

The means consists essentially of an electric motor, a governor attached to the shaft thereof, a motor speed controlling device and a speed indicating device.

It is intended that the tuning of the radio apparatus be accomplished and controlled from a point remote therefrom but within audible range by having at hand an off and on switch for the radio apparatus, a motor speed controlling device and a speed indicating device for the tuning motor.

The conventional trend for controlling the tuning elements of radio apparatus at a point remote therefrom has been to prelocate the settings for a specific number of radio frequency channels, then by operating a dial or push button the tuning mechanism would start to function until the desired setting has been accomplished. These means of controlling the tuning of radio apparatus at remote points becomes limited to the number of channels for which the mechanism is designed the cost of the equipment increasing as the number of channels is increased.

My invention departs from this conventional trend by utilizing the principle of centrifugal force. A governor which is based on this principle and which I use in this invention has a sliding member, the position of this member changing in a straight line as the rotative speed of the governor changes. By attaching this sliding member to a variable tuning element the latter can be adjusted to any position by changing the rotative speed of the governor.

By mounting the governor on the shaft of an electric motor the governor can be made to rotate at any desired speed. It will be apparent then that if the speed of the motor is maintained constant, the sliding member of the governor will remain in a fixed position and the tuning element which is attached to this member will also remain in a fixed position. Changing the speed of the motor changes the position of the sliding member and therefore the tuning element.

There are several means for controlling the speed of a motor. One method which I have herein shown consists of inserting a resistance in series with the motor windings and the power source. Adjusting this resistance changes the electromotive force across the motor terminals thereby changing its speed. A voltmeter connected in shunt across the motor terminals, will indicate indirectly the motor speed. By calibrating the voltmeter to a special scale the position of the tuning element can be read directly on the voltmeter. It will be obvious that there are other means for reading the motor speed such as an ammeter specially calibrated and connected in series with the speed controlling resistance.

Tuning from a remote point is accomplished by mounting a motor speed controlling unit and a speed indicator in a small box and wiring these to the motor located in proximity to the tuning apparatus.

Figure 2:
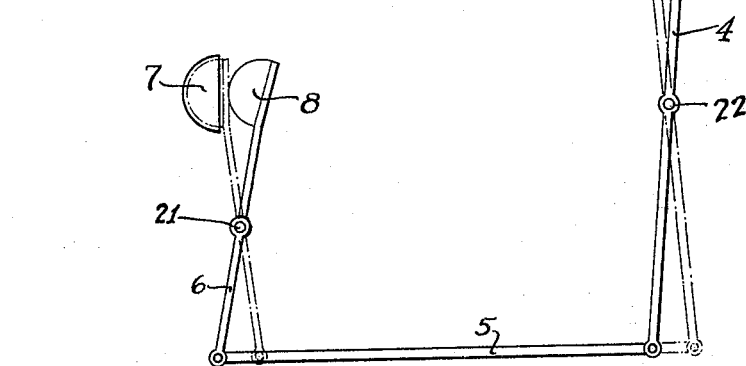
Figure 2:
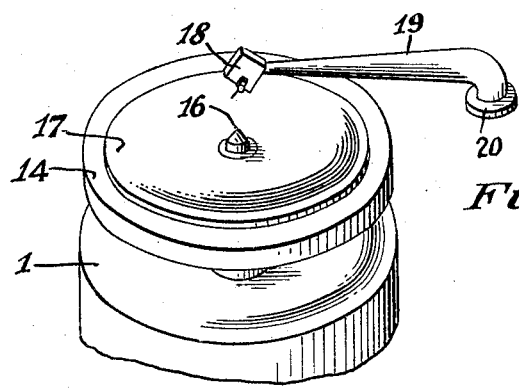

My invention will be more fully understood by reference to the attached drawing wherein Fig. 1 shows, in diagrammatic form, a simple layout of the equipment and the wiring connections between the motor and control devices. Figure 2 shows a pictorial view of the outer surface of the fly wheel shown in Figure 1. The flywheel as here shown is utilized as a platter for holding disc phonograph records. An electrical pickup is also shown with its needle in contact with a record.

Referring to Fig. 1: At 1 is indicated a power means such as an electric motor for actuating governor 2. At 3 is indicated the sliding member of the governor to which is attached levers 4, 5 and 6. At 7 is shown the stator of a conventional variable tuning condenser. The rotor of this condenser is shown at 8 with its shaft at 21 to which is attached lever 6. In this connection it will be obvious that the condenser shaft 21 could be located at 22 and that lever 4 which engages member 3 could terminate at shaft 22, the lever 4 being thusly an arm upon the condenser shaft. As shown in the figure the series of levers 4, 5, and 6 are to be considered as merely an extension of lever 4. At 9 is shown a speed controlling device such as an adjustable resistance. At 13 is indicated the adjustable arm on speed control device 9. At 10 is indicated a conventional voltmeter having a special calibration. 11 and 12 represent the power leads from the line to the motor windings. At 14 is indicated a fly wheel mounted on shaft of motor 1 on the side of motor 1 opposite governor 2. At 15 is indicated a line voltage regulator.

Referring to Figure 2: At 1 is shown the motor turned with its shaft 16 in a vertical position. The flywheel 14 when mounted in this position is used as a platter for holding disc record 17. At 18 is shown the electrical pickup in contact with record 17. At 19 is shown the arm for holding the pickup 18 and at 20 is shown the mounting for the pickup arm 19.

The equipment as described is operated as follows:

The tuning element of the radio apparatus is brought into the desired tuning position by adjusting arm 13 on rheostat 9. When arm 13 is moved along the contacts of rheostat 9 the voltage across the terminals of the motor 1 will be changed. The motor 1 then adjusts itself to a new speed resulting in a changed position of the sliding member 3 of governor 2. This change of position of member 3 is transmitted to rotor 8 through the series of levers 4, 5, and 6.

As the arm 13 of rheostat 9 is moved to various positions the broadcast channels may be logged by noting the position of the needle on voltmeter 10.

By adjusting the rheostat 9 so that the motor will run at commercial speeds phonograph records may be rotated by motor 1. This is acomplished by mounting the motor 1 with its shaft 16 in a vertical position. The flywheel 14 is then used as a platter to hold the disc records, the pickup equipment being suitably mounted adjacent the flywheel 14.

While the equipment shown indicates a simple series wound electric motor its speed being controlled by a rheostat, it is to be understood that any type of motor and speed controlling device may be used without departing from this disclosure. The speed indicator is shown as a voltmeter. It is to be understood also that this may be an ammeter or a mechanical speed indicating device.

It will now be obvious that the principle applied to a single tuning unit may also be applied to a plurality of tuning units by either ganging the tuning units to a single control as is obtained in the conventional radio receiving set or by providing a separate tuning device as shown in the accompanying drawing for each tuning control. Furthermore the principle can be applied to a variometer or a resistance to control the volume of a radio set.

In the following claims reference to "tuning position" and "tuning element" shall be construed as applying to capacity or inductance tuning, resistance settings or tone control switches.

I claim:

1. In radio apparatus, a means for tuning said apparatus, said means comprising an electric motor, a device for controlling the speed of said motor, a governor operated by said motor, an arm upon the shaft of the tuning element of said apparatus, said arm engaging the sliding member of said governor, said element being actuated to any tuning position by said member, said position being attained and maintained by the speed of said motor.

2. In radio apparatus, a means for tuning said apparatus, said means comprising an electric motor, devices for controlling and indicating the speed of said motor, a governor operated by said motor, an arm upon the shaft of the tuning element of said apparatus, said arm engaging the sliding member of said governor, said element being actuated to any tuning position by said member, said position being attained and maintained by the speed of said motor.

3. A radio tuning device, comprising a motor, a governor upon the shaft of said motor, a means for controlling the speed of said motor, an arm upon the shaft of an adjustable radio tuning element, said arm engaging the sliding member of said governor, said device actuating said element to any tuning position, said position being relative to the speed of said motor.

4. A radio tuning device, comprising a motor, a governor upon the shaft of said motor, means for controlling and indicating the speed of said motor, an arm upon the shaft of an adjustable radio tuning element, said arm engaging the sliding member of said governor, said device actuating said element to any tuning position, said position being relative to the speed of said motor.

5. In combination with radio apparatus a means for revolving records said means comprising an electric motor, a motor speed controlling device, a motor speed indicating device said means being common to a device for actuating the tuning unit in said radio apparatus.

6. In radio apparatus, in combination with a radio tuning device, comprising a motor, a governor upon the shaft of said motor, means for controlling and indicating the speed of said motor, an arm upon the shaft of the tuning element of said apparatus, said arm engaging the sliding member of said governor, the movement of said member actuating said element to any tuning position relative to the speed of said motor and an attachment for playing disc records, said attachment comprising a record holder upon the shaft of said motor and operating in common with said radio tuning device.

7. In a radio tuning device, in combination with the tuning element of a radio receiver, an arm upon the shaft of said element, a means for rotating said shaft in a reciprocating manner, said means comprising a motor actuated governor, the sliding member of said governor engaging said arm and a speed controlling device for varying the movement of said governor.

LE ROY S. HUBBELL.